Figure 1:
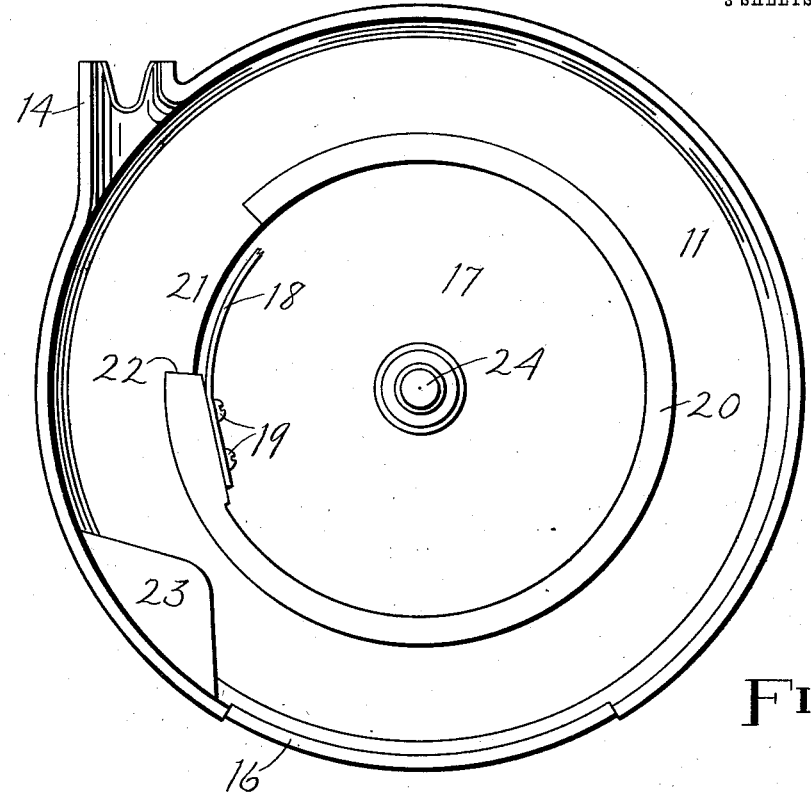

No. 889,264. PATENTED JUNE 2, 1908.
R. SHIELDS.
TROLLEY CATCHER AND RETRIEVER.
APPLICATION FILED APR. 22, 1907.

3 SHEETS—SHEET 1.

WITNESSES
P. H. Martin
J. M. Sterne

INVENTOR
Robert Shields,
BY
Webster & Co.,
ATTORNEYS

No. 889,264. PATENTED JUNE 2, 1908.
R. SHIELDS.
TROLLEY CATCHER AND RETRIEVER.
APPLICATION FILED APR. 22, 1907.

3 SHEETS—SHEET 2.

WITNESSES
P. H. Martin
J. M. Sterns

INVENTOR
Robert Shields,
BY
Webster & Co.,
ATTORNEYS

No. 889,264. PATENTED JUNE 2, 1908.
R. SHIELDS.
TROLLEY CATCHER AND RETRIEVER.
APPLICATION FILED APR. 22, 1907.

3 SHEETS—SHEET 3.

WITNESSES
P. H. Martin
J. M. Sterns

INVENTOR
Robert Shields,
BY
Webster & Co.,
ATTORNEYS

UNITED STATES PATENT OFFICE.

ROBERT SHIELDS, OF SOUTH BOSTON, MASSACHUSETTS, ASSIGNOR TO FRANK RIDLON COMPANY, OF BOSTON, MASSACHUSETTS, A CORPORATION OF MASSACHUSETTS.

TROLLEY CATCHER AND RETRIEVER.

No. 889,264.   Specification of Letters Patent.   Patented June 2, 1908.

Application filed April 22, 1907. Serial No. 369,474.

*To all whom it may concern:*

Be it known that I, ROBERT SHIELDS, a citizen of the United States of America, residing at South Boston, in the county of Suffolk and State of Massachusetts, have invented a new and useful Trolley Catcher and Retriever, of which the following is a specification.

My invention relates to improvements in devices for controlling the trolley-ropes of electric cars, and consists essentially of certain peculiar locking and releasing mechanism for the reel upon which the trolley-rope is wound, together with such other auxiliary parts and combinations of parts as may be required to render such mechanism effective, all as hereinafter set forth.

The objects of my invention are, first, to produce a combined catcher and retriever for trolleys capable of normally keeping taut the trolley-rope connected therewith as the associated trolley rises and falls in following the undulations of the electric conductor or overhead wire, of checking almost instantly the running trolley-rope when the trolley leaves the wire and so catching said trolley, and of quickly operating to wind up said trolley-rope after it has been checked by the catcher and thus draw down the trolley below said wire or retrieve it; second, to provide such a device which is comparatively simple in construction, easy and simple yet positive in action or operation, compact, and adapted to withstand the large amount of customary hard usage, shock and jar incident to devices of this kind without breaking or getting out of order, and also one which is applicable to any trolley-rope and upon any trolley-car; third, to provide a combined catcher and retriever which when once properly prepared or arranged for use, or set, requires no further attention for this or any other purpose beyond that incident to drawing some of the trolley-rope from the reel of the device, after the act of retrieving has taken place, in order to permit the trolley to be replaced on the wire, and, fourth, to afford means for preventing the unlocking of the parts upon the rebound of the trolley-pole. I attain these objects by the mechanism illustrated in the accompanying drawings, in which—

Figure 2:
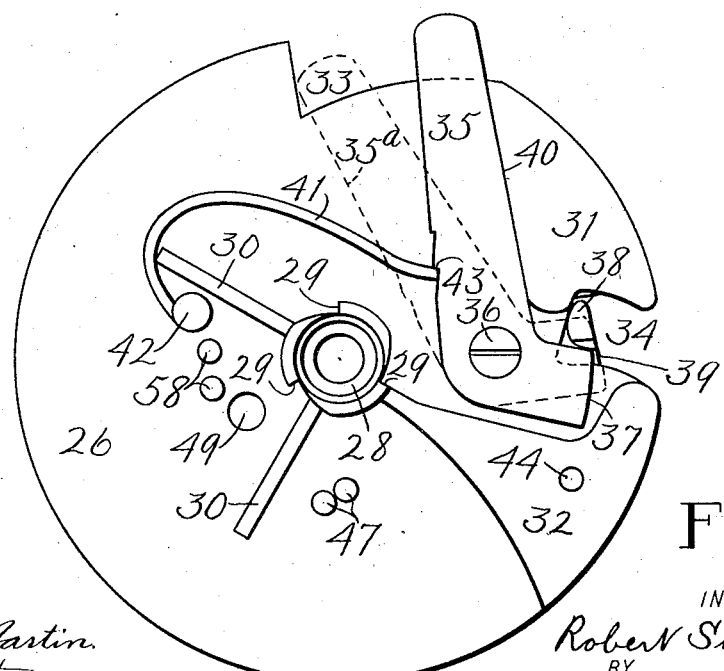
Figure 3:
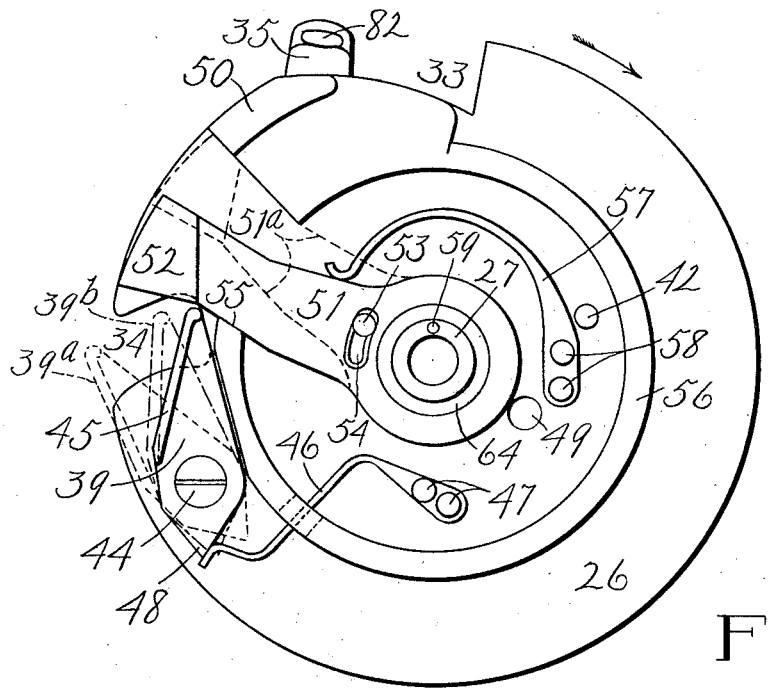
Figure 4:
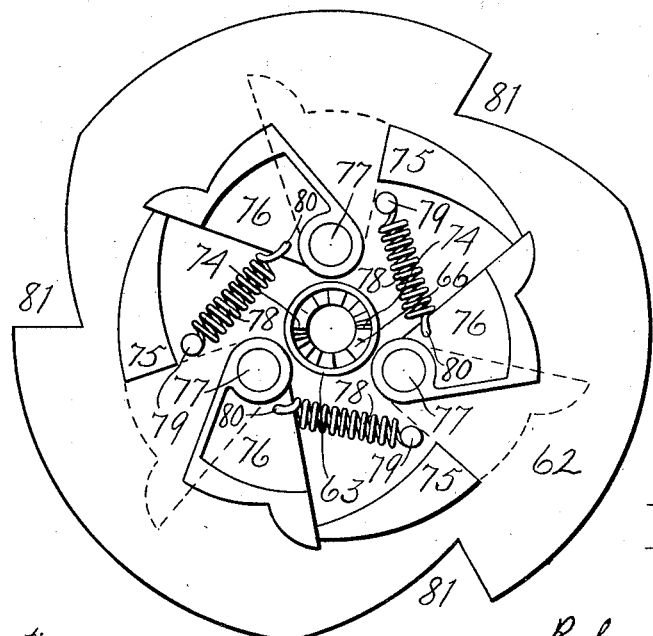
Figure 5:
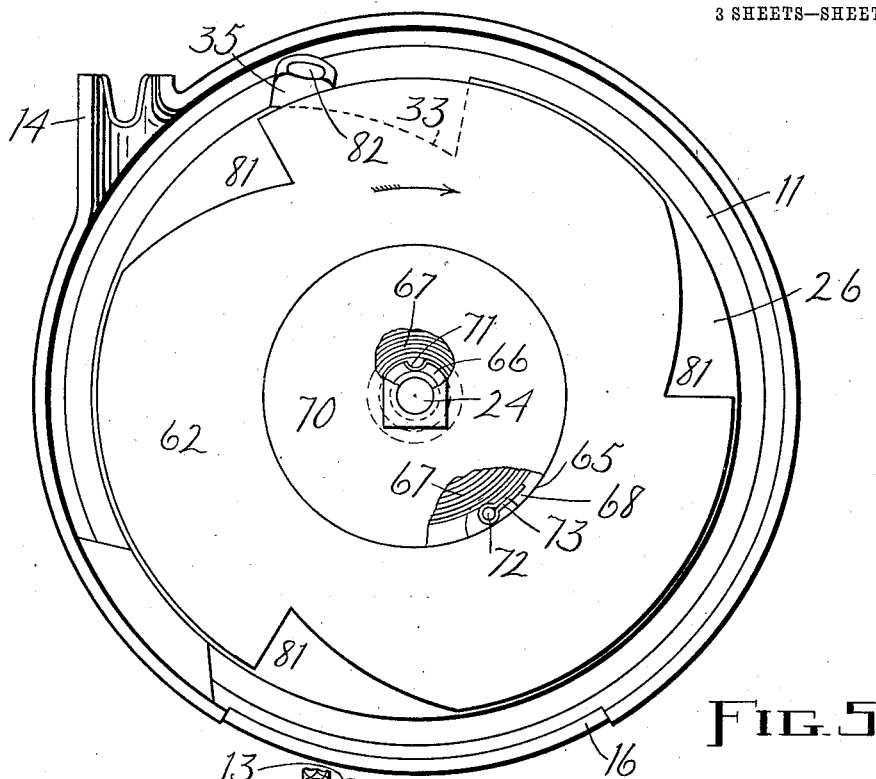
Figure 6:
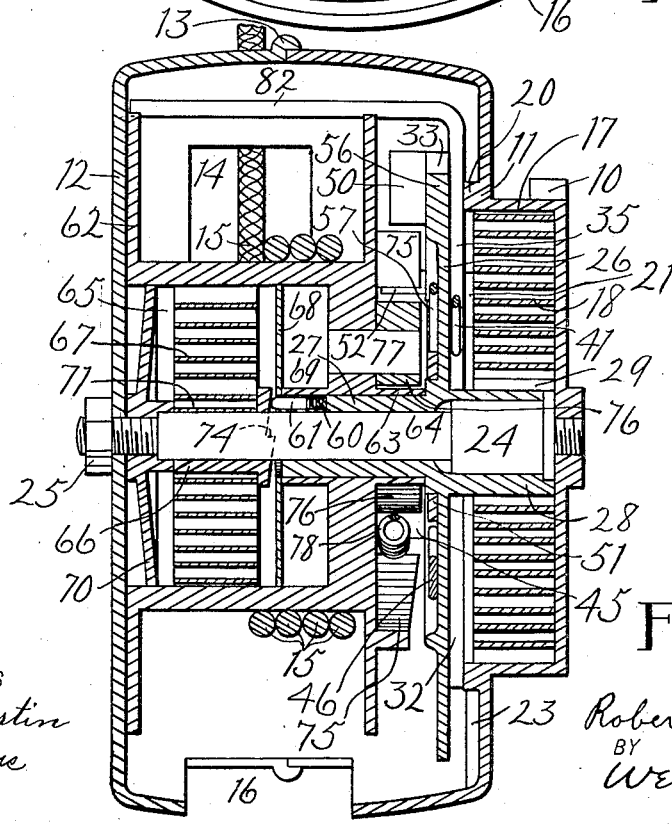

Figure 1 is an inside view of the back section of the case, one end of the retriever spring being shown; Fig. 2, a rear elevation of the retriever disk; Fig. 3, a front elevation of said disk; Fig. 4, a rear elevation of the reel and anchorage sleeve; Fig. 5, a front elevation of the assembled parts without the front section of the case, portions of the cover or face plate for the chamber in the reel for the reel spring being broken out to disclose such spring and the attachments therefor, and, Fig. 6, a central vertical section of the complete device taken from front to back and looking toward the left as the parts stand in the preceding view.

Similar figures refer to similar parts throughout the several views.

The trolley catcher and retriever comprises generally a suitable case provided with an axial stud, a retriever spring in such case, a retriever disk on such stud under the influence of such spring, locking and releasing appliances for such disk a reel on a hub of said disk, locking and releasing appliances for such reel, and a reel spring in the latter. The drawings illustrate the embodiment of these features in a practical device, but it is to be understood that I do not wish to be restricted to the exact construction therein shown, as I desire and intend to include within the scope of my claims any and all modifications to which I am entitled.

The catcher which forms part of the present invention by entering into combination with elements in the retriever mechanism, or rather certain parts of said catcher such as the reel with its pawl and abutments, the reel spring and the anchorage sleeve therefor, and the yielding member which prevents such sleeve from revolving in one direction, are substantially like similar parts of the subject matter of my application for Letters Patent of the United States filed March 14th, 1906, and serially numbered 305,986, and for this reason are not herein specifically claimed or claimed outside of the combinations made up of the elements with others which do not appear in said application. It is clear therefore that I do not abandon any right in the catcher or in any part thereof by failing to claim the same in this application. It will, however, in order to fully describe my invention, be necessary to explain in detail the construction as well as the operation of the old members.

Having reference to the drawings I will first describe the case for the mechanism, which case, be it remembered, is to be fastened in any suitable manner and by any suitable means to a dasher or other convenient part of a car, such fastening means forming no part of the present invention and being therefore omitted except for a lug 10 on the back of the case which is intended to be utilized for this purpose. Said case consists of a back section 11 and a front section 12, the latter having a flange 13 to lap over the rim of the former. The case is provided with a projection 14 having a passage therethrough for a trolley rope or cord 15. The flange 13 is cut away both sides of the projection 14 to receive that portion of such projection which is on the section 11 and so cause both of the case sections to be properly positioned relative to each other. In the bottom of the case is a hand-hole 16. In the back part of the section 11 an annular chamber 17 is formed for the retriever spring 18 which has its outer end fastened at 19 to one side of said chamber. A flange 20 surrounds the chamber 17 except at 21 where it is cut away to form a shoulder 22. At one point in the section 11 between the wall and the flange 20 is a cam projection or lug 23.

An axial stud 24 has one end secured in or to the back of the section 11 while the other end extends beyond the section 12 to receive a nut 25 by means of which with the flange 13 the two sections are securely held together.

A retriever disk 26 having front and rear hubs 27 and 28, respectively, is mounted on the stud 24 and is free to revolve thereon. The rear hub 28 is provided with external engaging shoulders 29 for the inner end of the spring 18 which is adapted to be locked to said hub when under tension, but will snap by said shoulders in the event that the disk 26 shall be rotated in the opposite direction to that indicated by the arrow in Fig. 3 or backward after said spring has expended its force or run down. The back end of the hub 28 bears against the back of the case, and the disk 26 is provided with two ribs 30 and the two other raised portions 31 and 32 which ride on or bear against the flange 20. The periphery of the disk is notched at 33 and 34. An annular rocker arm 35 is pivoted at 36 to the back side of the disk and extends upward or outward beyond the notch 33. The upper or outer end of this arm is bent forward and extends nearly to the front of the case, while its heel 37 is adapted to be moved into the path of the nose 38 of a dog or latch 39 which operates in and out of the notch 34.

The arm 35 is held normally against a shoulder 40 formed by the raised portion 31, by means of a spring 41 having one end fastened to the disk at 42 and the other end in engagement with the edge of said arm which is opposite that which bears or is adapted to bear against said shoulder, so that the heel 37 is out of the way of the latch 39. The spring-engaging edge of the arm is notched at 43 to receive the adjacent end of the spring 41, two or more notches being provided so as to afford means for varying the tension of said spring. The latch 39 is pivoted at 44 on the front side of the disk, its nose 38 projects far enough to the rear to engage the shoulder 22 and the cam projection 33 under certain conditions, and said latch has a ridge 45 along the outer edge of its face. A spring 46 has one end fastened to the disk at 47 and the other end contiguous to the heel 48 of the latch, the construction and arrangement of parts being such that said spring tensions said latch in one direction or the other according to the position of the latter, that is to say, the latch either has a tendency to carry its nose inward as when the spring bears on the inner edge of said heel, or else to carry said nose outward as when the spring bears on the outer edge of the heel, as will be more clearly understood from the subsequent explanation of the operation of the mechanism. When the latch is thrown inward the nose comes to rest either against the inner edge of the notch 34, or against the heel 37 of the arm 35, or against the periphery of the flange 20, and when thrust outward so that the point of the heel 48 passes by the engaging end of the spring 46 said nose comes to rest against the wall of the section 11 except when it encounters the projection 23. 49 is a hole in the disk placed there merely for the passage of a suitable implement employed to assist in manipulating the spring 18 to cause it to engage one of the shoulders 29 at the time the disk is mounted on the stud 24.

On the front of the disk 26 at the edge, adjacent to one end of the notch 33, is an abutment 50 for a buffer arm 51 mounted at its inner end on the hub 27. At the outer end of the arm 51 on the front side is an abutment 52. The arm 51 is held against the face of the disk by a pin 53 which passes through a slot 54 in said arm into said disk and has a head which overlaps the flanged edges of said slot. The range of operation of the arm 51 is between the abutment 50 and the latch 39 or rather a shoulder 55 adjacent to said latch, said shoulder being at one end of a raised portion 56 of the disk. This arm is held normally remote from the abutment 50 and in contact with the shoulder 55 by means of a spring 57 having one end fastened at 58 to the disk and the other end bearing on the edge of said arm which is adjacent to said abutment. The raised part 56 is slotted to permit the spring 46 to pass through and work freely. A longitudinal hole 59 is made in the front end of the hub 27 for a spring 60 and a pin 61.

A reel 62, to which one end of the cord 15 is secured in any suitable manner, is loosely mounted on the hub 27, with its rearwardly extending hub 63 bearing against a shouldered part 64 of said hub 27. Within the reel 62 is a chamber 65. An anchorage sleeve 66, for a reel spring 67, is loosely mounted on the stud 24 in front of the hub 27, and a plate 68, which serves as a backing for the spring 67, encircles said stud between said sleeve and the adjacent end of the forwardly-extending hub 69 of the reel. A face plate 70 is screwed onto the front threaded terminal of the stud 24, inside of the case, to assist in retaining the sleeve 66 in place and to close the front of the chamber 65, the reel spring being confined laterally between this plate and the plate 68. It will be clearly seen from the description heretofore given that the back side of the section 11 and the face plate 70 hold the members mounted on the stud 24 against endwise movement. The inner bent end of the spring 67 is attached to the sleeve 66 in the manner best shown at 71 in Fig. 5, while the outer end of said spring is fastened to a pin 72 set in a boss 75 in the chamber 65. On the rear end of the sleeve 66 are ratchet teeth 74 arranged to engage the protruding end of the spring-pressed pin 61, the slopes of said teeth being such that said sleeve is not prevented from rotating independently in the opposite direction to that indicated by the arrow in Fig. 5 or backward, but said pin restrains the sleeve from independent rotation in the direction of said arrow or forward.

With the disk 26 locked so that the pin 61 has no movement around the axis of the device, it is at once apparent that when the reel 62 is revolved in the direction of the arrow in Fig. 5 the spring 67 will be wound up, because the sleeve 66, to which the inner end of said spring is attached, is prevented from rotating by said pin and the engaging ratchet-tooth 74; but when said reel revolves or is revolved in the opposite direction and after said spring runs down the latter will not be destroyed or broken by the continued rotation of the reel, owing to the fact that the ratchet-teeth now slip past said pin, the spring 60 yielding for this purpose. This arrangement is also useful in assisting to overcome any momentum that may be imparted to the reel by the unwinding of the spring.

The cord 15 is given the desired number of turns around the reel initially in either of two ways: first, by winding said cord about said reel while the section 12 is off, the spring 67 remaining inactive and being undisturbed, and, second, by reaching through the hand-hole 16 and rotating the reel backward, the ratchet-teeth 74 meanwhile clicking past the pin 61. Now any upward pull on the cord, under ordinary circumstances, will cause the reel spring to be wound up more or less according to the amount of cord unreeled, and when the cord is slackened said spring will in turn cause the cord to be again wound on the reel, thus the cord is kept taut in both cases or under both conditions.

The reel 62 is equipped on the back with a plurality of abutments 75 and dogs or pawls 76, there being three of each in the present instance, although this number may vary. The abutments 75 are fixed immovably to the reel, but the pawls 76 are pivotally connected therewith, the inner end of each of the latter either being mounted on a pin extending rearwardly from said reel, or having a stud which enters a hole in the back of the reel, 77 representing such pivot or stud. In one case the pawl turns on its pin and in the other case the pin or stud turns with the pawl. Each pawl 76 is so formed and located that its movement in one direction is limited by the adjacent end of one abutment 75 and in the other direction by the adjacent end of another abutment, so that it can oscillate between and contact with two adjacent abutments. The pawls are drawn inward normally with their outer ends or heads in contact with what may be termed the feet of the abutments by means of light springs 78. Each spring 78 has one end fastened to the reel at 79 and the other end to a pawl at 80. The latch ridge 45 and the arm abutment 52 are always outside of the path of travel of the abutments 75 as the reel revolves, and the pawls 76 when in the position just noted also clear said ridge and arm abutments. Said pawls will remain in this position while the reel revolves in the direction of the Fig. 5 arrow with a steady and even motion which is insufficient to overcome by centrifugal force the power of the springs 78, but under a sudden acceleration of speed imparted to the reel in this direction, as when the trolley-wheel slips from the wire and the cord attached to the trolley-pole is suddenly jerked upward, the power of said springs is overcome and the pawls swing outward until their heads contact with the heads instead of the feet of the abutments 75, each pawl now bearing against the abutment behind, in the line of rotation, that against which it had previously rested, as indicated by the dotted lines in Fig. 4. The abutment 52 is now in the path of the pawls and the ridge 45 may be. In the rims of the reel are the same number of pairs of notches 81 as there are pawls, which notches are each similar to the notch 33 in the disk 26. The location and relationship of the notches 81 to the pawls 76, and of the notch 33 to the abutments 50 and 52, and of all of these parts to each other are such that when one of said pawls is in engagement with said abutment 52 and this is in engagement with said abutment 50 one pair of said notches 81 is abreast of or in alinement with said notch 33.

Having described in detail the construction of my device, I will next proceed to explain the complete operation of the same beginning with the initial setting of the mechanism, the reel spring and the retriever spring both being loose, and continuing with the several subsequent actions thereof, it being assumed that the parts stand to commence with as shown in full lines in the drawings, without the cord and the front section of the case being off. First rotate the reel 62 by hand to wind up the spring 67, next attach the cord 15 to said reel while holding the latter, and then release the reel and allow about ten feet of said cord to wind onto the reel. Now give the cord a sudden pull with the result that the reel is rotated and throws out the pawls 76, in the manner already explained, to lock the reel and the disk 26 together, this last being accomplished by the pawl which strikes the ridge 45 and knocks the latch 39 outward into the position indicated by the dotted lines 39$^a$ in Fig. 3, and then encounters the abutment 52 and actuates it into contact with the abutment 50, swinging the buffer arm 51 against the force of the spring 57, as indicated by the dotted lines 51$^a$ in the aforesaid view. While holding the cord tight with the reel and disk thus locked together, wind said cord around the reel and over the horizontal part 82 of the rocker arm 35, with the result that, since the angle formed by the arm 35 with a line passing through the center of the stud 24 and that of the pivot 36 is always less than a right-angle, said arm is swung inward against the force of the spring 41, as indicated by the dotted lines 35$^a$ in Fig. 2, as the part 82 is borne by the cord into the deep portion of the notch 33 and corresponding portions of the alining notches 81 and into contact with the radial sides thereof, for, be it remembered, one pair of the notches 81 is at this time in alinement with said notch 33. After five or six turns of the cord have been made around the reel taking in the part 82, as just noted, draw off the cord to rotate the reel and disk in the direction of the arrows in Figs. 3 and 5 and wind up the spring 18. Meanwhile the nose 38 encounters the projection or lug 23 when it comes around to said lug the first time, after the latch has been thrown out by the active pawl 76, and said latch is thereby thrust inward with its nose against the heel 37 of the arm 35, this position being indicated by the dot-and-dash lines 39$^b$ in Fig. 3, so as to be in readiness to enter the opening 21 as soon as the cord releases the part 82 which latter then immediately flies out of the notches 81 and 33. The arm 35 having been restored to normal position by the spring 41 and its heel having moved out of the path of the nose 38, the latch is permitted under the influence of the spring 46 to enter the opening 21 where it engages with said nose the shoulder 22, thus locking the disk to the case with the retriever spring under tension. After the cord has been wound off of the part 82 and the latch nose has entered the opening 21 said nose will strike the end of the flange 20 which is opposite the shoulder 22 in case an effort is made to still further rotate the interlocked disk and reel against the force of the spring 18. The reel, not being checked by or with the disk and always being under tension from its spring 67, rotates far enough in the reverse direction to withdraw its active pawl from engagement with the disk, the spring 57 assisting in this as it rocks the arm 51 over against the shoulder 55, and to permit this pawl to be drawn inward by its spring 78 with the other pawls. The device is now set initially ready for actual use. The resetting of the device, after its initial setting, is comparatively simple as will be made clear hereinafter.

After the device has been set the section 12 should be fastened in place.

During the setting operation the spring 67 has remained practically inactive although under tension. When the cord 15 is connected with the trolley-pole the tension on the spring 67 can be increased if desired by drawing off more of the cord from the reel and thus rotating the latter in the direction of the Fig. 5 arrow. It is possible to thus wind up the spring 67 to any extent owing to the fact that this spring is very much weaker than the spring 18, and to the further fact that the pin 61 is holding the sleeve 66 against rotation.

The device in the present condition permits the cord to move up and down with the trolley as the latter follows the variations in height of the wire, the reel winding up the spring 67 when said cord is drawn off and the spring causing said reel to rewind the cord when it is slacked. The cord is thus kept under tension all the time that the trolley remains on the wire.

When the trolley leaves the wire, as it frequently does, the cord 15 is jerked violently upward and immediately brings about a locking engagement between the reel 62 and the disk 26, through the medium of one of the pawls 76, the buffer arm 51 and the abutment 50, and the unlocking of said disk from the case by the throwing out of the latch 39 by the active pawl. Instantly the spring 18 acts to revolve the rotary members, wind up the cord and draw down the trolley to a point below the wire. What takes place at this time will be pretty generally understood from the preceding description of the setting process, but may be briefly recapitulated as follows: When the latch 39 is thrown into the position at 39$^a$ its nose 38 necessarily leaves the shoulder 22 and so releases the disk 26 to the spring 18, the latter commences to rotate said disk backward and with it the reel 62 which is locked to the disk by the active pawl 76, and the cord 15 is wound around both the reel and the horizontal part of the arm 35 and rocks the latter so that its heel 37 receives the nose of the latch when said latch is thrown into the position 39$^b$ by the lug 23, the nose 38 encountering said lug directly after being forced from the shoulder 22, and prevents said nose 38 from entering the opening 21 as it is carried around by the disk. This backward rotation of the parts under the influence of the spring 18 continues until said spring expends its force, when further motion ceases and the retrieving operation is finished.

To reset the device so as to allow the trolley to be reconnected with the wire and the cord to play freely up and down as before, it is necessary simply to draw off enough of the cord to free the arm 35, which results in rewinding the spring 18, and then to relax the cord so as to permit the latch nose to be brought back onto the shoulder 22, the latch having been actuated by its spring into operative position with its nose in the opening 21 when said arm was released to its spring and so actuated out of the way of the latch. The cord now operates under the influence of the reel spring as before, until the trolley flies off of the wire again when there is a recurrence of the retrieving movements followed by the resetting.

In case the trolley-pole rebounds, when first checked in its upward flight and before the retriever spring commences to wind up the cord through the medium of the intervening mechanism, and the reel is released for an instant by the consequent slackening of the cord, the reel spring immediately acts to rotate said reel with the result that the arm 51 moves away from the abutment 50, under the influence of the spring 57, and by so doing keeps the active pawl in contact with its engaging abutment; otherwise such pawl might separate from such abutment and be drawn in by its spring 78 too far to engage the locking member on the disk and so cause a miscarriage on the part of the device and defeat the purpose of the invention. Inasmuch as the force of the rebound of the trolley-pole is quickly expended and the action of the retriever spring is delayed only for a fraction of a second, the gap between the abutments 52 and 50 is closed almost as soon as opened and the retrieving operation proceeds without perceptible interruption.

The momentum of the reel imparted thereto in the reverse direction by the shock occasioned by the locking of the disk to the case, through the medium of the latch, coupled with the force of the spring 67 exerted in the same direction, is quite sufficient to bring about the withdrawal of the active pawl from engagement with the arm 51 and to afford an opportunity for all of the pawls to be drawn inward so as to clear the latch and the abutment 52, the cord being loose, of course, at the time, and the arm 51 assisting the active pawl.

It should be clearly understood that when either of the pawls is in active operation it is clamped, as it were, between the contacting abutment 75 and the abutting parts of the disk.

The shape of the lug 23 is such that it will cause the latch 39 to snap inward when brought into contact therewith from either direction.

What I claim as my invention, and desire to secure by Letters Patent, is—

1. In a trolley catcher and retriever, a case provided with a lug and a shoulder, a disk revolubly mounted in such case and provided with a hub, a spring arranged between such disk and case to actuate the former in one direction, a latch carried by said disk and adapted to be actuated inward by said lug to engage said shoulder and lock said disk to said case, means to hold such latch out of locking position, a reel revolubly mounted on such hub, and means to disengage said latch from the shoulder, lock said reel and disk together and release them.

2. In a trolley catcher and retriever, a case provided with a lug and a shoulder, a disk spring-actuated in one direction revolubly mounted in such case, such disk having a hub and carrying a rocker arm and a latch, the latter being adapted to engage and release said shoulder and to be actuated inward by said lug, a reel revolubly mounted on said hub, and a cord attached to said reel, said rocker arm being adapted to be engaged by said cord and so held as to prevent said latch from engaging the shoulder.

3. In a trolley catcher and retriever, a case provided with a lug and a shoulder, a disk revolubly mounted in such case and provided with a hub, a spring arranged between such disk and case to actuate the former in one direction, a latch carried by said disk and adapted to be actuated inward by said lug to engage said shoulder and lock said disk to said case, means also carried by the disk to hold such latch out of locking position, a reel revolubly mounted on such hub, and means carried by such reel to disengage said latch from the shoulder, to lock said reel and disk together and to release them.

4. In a trolley catcher and retriever, a case provided with a lug and a shoulder, a disk revolubly mounted in such case, such disk having a hub, a reel revolubly mounted on said hub, a spring arranged between said case and said disk to actuate the latter in one direction, a latch carried by the disk and adapted to be actuated inward by said lug to engage said shoulder and lock the disk against the action of said spring, and a pawl carried by said reel and adapted to bring about the release of the disk by disengaging said latch from the shoulder and to lock the reel and disk together.

5. In a trolley catcher and retriever, a case provided with a lug and a shoulder, a disk revolubly mounted in such case, such disk having a hub, a reel revolubly mounted on such hub, a spring arranged between such case and said disk to actuate the latter in one direction, a latch carried by the disk and adapted to be actuated inward by said lug to engage said shoulder and lock the disk against the action of said spring, a pawl carried by such reel and adapted to bring about the release of the disk by disengaging said latch from the shoulder, and to lock the reel and disk together, a rocker arm also carried by the disk, and means adapted to retain said arm temporarily in a position to prevent the relocking of the disk to said case.

6. In a trolley catcher and retriever, a case provided with a lug and a shoulder, a stud in said case, a disk revolubly mounted on such stud, such disk having a hub, a reel revolubly mounted on such hub, a spring arranged between such case and said disk to actuate the latter in one direction, a latch carried by the disk and adapted to be actuated inward by said lug to engage said shoulder and lock the disk against the action of said spring, a pawl carried by said reel and adapted to bring about the release of the disk by disengaging said latch from the shoulder and to lock the reel and disk together, a rocker arm also carried by the disk, means adapted to retain said arm temporarily in a position to prevent the relocking of the disk to said case, a sleeve revolubly mounted on said stud with one end adjacent to the outer end of said hub, yielding engaging means between the adjacent ends of the sleeve and hub to limit to one direction the movement of the sleeve independent of the hub, and a second spring weaker than the first arranged between said sleeve and the reel.

7. The combination, in a trolley catcher, with a case provided with a lug and a shoulder, a disk revolubly mounted in such case and spring-actuated in one direction, and a latch carried by such disk, such latch being adapted to engage and release said shoulder and to be actuated inward by said lug, of a revolubly mounted reel, and locking and releasing mechanism between the disk and reel.

8. The combination, in a trolley catcher and retriever, with a case provided with a lug and a shoulder, a disk revolubly mounted in such case and spring-actuated in one direction, a latch carried by such disk, such latch being adapted to engage and release said shoulder and to be actuated inward by said lug, and a rocker arm also carried by such disk, of a revolubly mounted reel, and locking and releasing mechanism between the disk and reel, said rocker arm having a cord-receiving part which extends across said reel and a heel adapted to be thrust into the path of said latch.

9. The combination, in a trolley catcher and retriever, with a case provided with a lug and a shoulder, a notched disk revolubly mounted in such case and spring-actuated in one direction, a latch carried by such disk, such latch being adapted to engage and release said shoulder and to be actuated inward by said lug, and a rocker arm also carried by such disk, of a revolubly mounted notched reel, and locking and releasing mechanism between the disk and reel, said rocker arm having a cord-receiving part which extends across said reel and is adapted to enter the notches in the disk and reel, and said arm also having a heel adapted to be thrust into the path of the latch.

10. The combination, in a trolley catcher and retriever, with a case provided with a lug and a shoulder, a disk provided with a shouldered hub and a reel-receiving part and revolubly mounted in such case, a spring having one end fastened to said case and the other end adapted to form a slip engagement with the hub shoulders, and a latch carried by such disk, such latch being adapted to engage and release the case shoulder and to be actuated inward by said lug, of a reel revolubly mounted on said reel-receiving part of the disk, and locking and releasing mechanism between the disk and reel.

11. The combination, in a trolley catcher and retriever, of a case provided with a lug and a shoulder, a disk provided with a hub, an abutment and a shoulder, such disk being revolubly mounted in such case and spring-actuated in one direction, a latch carried by said disk and adapted to be actuated inward by said lug to engage said case shoulder and lock said disk to the case, means to hold such latch out of locking position, a buffer arm loosely mounted on said disk hub and provided with an abutment, such abutment being arranged to operate between said disk abutment and shoulder, means to retain said arm abutment normally out of contact with the disk abutment, a reel revolubly mounted on said hub, a pawl pivotally mounted on such reel and arranged when outwardly disposed to engage said arm abutment and actuate it into contact with said disk abutment, means to limit the extent of the outward movement of such pawl, and means to hold the pawl normally out of the way of the arm abutment.

12. The combination, in a trolley catcher and retriever, with a case provided with a lug and a shoulder, a disk provided with a hub and with an abutment, such disk being revolubly mounted in such case and spring-actuated in one direction, a latch carried by such disk and adapted to lock the same against the action of its spring and to release it thereto by engaging and releasing the case shoulder, a buffer arm mounted on such hub and provided with an abutment, and means to retain the arm abutment normally out of contact with the disk abutment, of a reel revolubly mounted on said hub, a pawl pivotally mounted on such reel and arranged when outwardly disposed to actuate said latch out of one of its positions and to engage said arm abutment and actuate it into contact with said disk abutment, means to limit the extent of the outward movement of such pawl, and means to hold the latter normally out of the way of the arm abutment, such latch being actuated inward by the case lug.

13. The combination, in a trolley catcher and retriever, of a case provided with a shoulder and with a lug, a disk provided with a hub and with an abutment, such disk being revolubly mounted in such case and spring-actuated in one direction, a latch carried by said disk and adapted to engage and release said shoulder, a reel revolubly mounted on said hub, and a pawl pivotally mounted on such reel and arranged when outwardly disposed to actuate said latch out of engagement with the shoulder and to engage said abutment, the latch being actuated inward to engage the case shoulder by the case lug.

14. The combination, in a trolley catcher and retriever, of a case provided with a shoulder and with a lug, a disk provided with a hub and with an abutment, such disk being revolubly mounted in such case and spring-actuated in one direction, a latch carried by said disk and adapted to be actuated inward by said lug to engage said shoulder, a buffer arm mounted on such hub and provided with an abutment, means to retain the arm abutment out of contact with the disk abutment, a reel revolubly mounted on said hub, and a pawl pivotally mounted on such reel and arranged when outwardly disposed to actuate said latch out of engagement with the shoulder and to engage said arm abutment and actuate it into contact with said disk abutment.

15. The combination, in a trolley catcher and retriever, with a case provided with a lug and a shoulder, a stud in such case, a disk provided with a hub and with an abutment, such disk being revolubly mounted on such stud and spring-actuated in one direction, a latch carried by the disk and adapted to be actuated inward by said lug to engage said shoulder and lock such disk against the action of its spring, and a spring-pressed pin in such hub, of a reel revolubly mounted on said hub, a pawl pivotally connected with such reel and adapted when outwardly disposed to actuate said latch out of engagement with said shoulder and to engage said abutment, a sleeve mounted on said stud and provided with ratchet-teeth for engagement with said pin, and a spring having one end attached to said reel and the other end attached to said sleeve.

16. The combination, in a trolley catcher and retriever, with a case provided with a lug and a shoulder, a stud in such case, a disk provided with a hub and with an abutment, such disk being revolubly mounted on such stud and spring-actuated in one direction, a latch carried by the disk and adapted to be actuated inward by said lug to engage such shoulder and lock such disk against the action of its spring, a buffer arm mounted on such hub and provided with an abutment, means to retain the arm abutment normally out of contact with the disk abutment, and a spring-pressed pin in said hub, of a reel revolubly mounted on the hub, a pawl pivotally connected with such reel and adapted when outwardly disposed to actuate said latch out of engagement with said shoulder and to engage said arm abutment and actuate it into contact with said disk abutment, a sleeve mounted on said stud and provided with ratchet-teeth for engagement with said pin, and a spring having one end attached to said reel and the other end attached to said sleeve.

ROBERT SHIELDS.

Witnesses:
ALICE L. GRIFFIN,
HENRY F. KELLOGG.